(12) United States Patent
Chan et al.

(10) Patent No.: US 7,724,598 B1
(45) Date of Patent: May 25, 2010

(54) MEGAFUNCTION BLOCK AND INTERFACE

(75) Inventors: Vinson Chan, San Jose, CA (US);
Chong H. Lee, San Ramon, CA (US);
Binh Ton, San Jose, CA (US);
Thiagaraja Gopalsamy, San Jose, CA (US); Marcel A. LeBlanc, Sunnyvale, CA (US); Neville Carvalho, Campbell, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/737,654

(22) Filed: Apr. 19, 2007

(51) Int. Cl.
*G11C 7/00* (2006.01)

(52) U.S. Cl. .................. 365/221; 326/38; 326/40; 365/189.011

(58) Field of Classification Search ............. 326/37–41, 326/47; 365/189.011, 211, 221
See application file for complete search history.

(56) References Cited

U.S. PATENT DOCUMENTS

| | | | | |
|---|---|---|---|---|
| 4,342,084 | A * | 7/1982 | Sager et al. ................... | 714/42 |
| 6,401,230 | B1 * | 6/2002 | Ahanessians et al. .......... | 716/1 |
| 6,976,239 | B1 * | 12/2005 | Allen et al. .................... | 716/16 |
| 7,075,331 | B2 * | 7/2006 | Pail et al. ...................... | 326/38 |
| 7,268,582 | B1 * | 9/2007 | Zheng et al. ................... | 326/38 |
| 7,346,860 | B1 * | 3/2008 | LeBlanc et al. ................ | 716/1 |
| 2003/0043670 | A1 * | 3/2003 | Niwa et al. ................... | 365/221 |
| 2005/0242834 | A1 * | 11/2005 | Vadi et al. ..................... | 326/37 |
| 2006/0036988 | A1 * | 2/2006 | Allen et al. .................... | 716/17 |
| 2006/0053404 | A1 * | 3/2006 | Allen et al. .................... | 716/16 |
| 2006/0190907 | A1 * | 8/2006 | Allen et al. .................... | 716/18 |
| 2006/0218323 | A1 * | 9/2006 | Chen et al. .................... | 710/65 |
| 2007/0115743 | A1 * | 5/2007 | Sartori et al. ................. | 365/221 |
| 2007/0242553 | A1 * | 10/2007 | Do .............................. | 365/230.05 |

OTHER PUBLICATIONS

Altera Chapter 5. Stratix II GX ALT2GXB_RECONFIG Megafunction User Guide (created Feb. 2006, see p. 5-16).*

* cited by examiner

*Primary Examiner*—James H. Cho
*Assistant Examiner*—Jason Crawford
(74) *Attorney, Agent, or Firm*—Martine Penilla & Gencarella, LLP (57) ABSTRACT

A megafunction block is provided that includes a serial interface enabling a user to specify settings of a configurable block of a programmable logic device. The megafunction block includes a register array having the capability of translating address information into actual addresses for a memory of the configurable block. Thus, as future configurations/standards are developed that a programmable logic device with the megafunction block will interfaces with, the settings for interfacing with the standards may be added to the register array. Consequently, the pin count will not need to increase as the megafunction block is scalable through the register map. Control logic verifies that the translated address is a valid address and the control logic will generate a selection signal based on whether a read or write operation is to be performed.

20 Claims, 5 Drawing Sheets

MEGAFUNCTION BLOCK AND INTERFACE

BACKGROUND

Programmable logic devices are desirable because of the flexibility these devices offer. However, with this flexibility comes challenges with regard to interfacing with the numerous interfaces that are currently available and features that will be developed in the future. As there are a number of configurable options depending on the user's situation, these various options may become unmanageable, especially with regard to the Input/Output (I/O) port count needed to support the plurality of configurable options. That is, if a set of I/O ports are used for each configurable option, the interface becomes overcrowded with I/O ports needed to support each configurable option.

As a result, there is a need to solve the problems of the prior art to provide a hardware block for a PLD that is capable of managing a large number of configurable options and a large number of I/O ports. In addition, the hardware block should be expandable and backward compatible.

SUMMARY

Broadly speaking, the present invention fills these needs by providing a megafunction block that has a fixed serial interface and employs a register map to translate address information to an actual physical address. The megafunction block is scalable and backwards compatible. It should be appreciated that the present invention can be implemented in numerous ways, including as a method, a system, or an apparatus. Several inventive embodiments of the present invention are described below.

In one aspect of the invention, the megafunction block includes a fixed serial interface enabling a user to specify settings of a configurable block of a programmable logic device. The megafunction block includes a register array having the capability of translating address information into actual addresses for a memory of the configurable block. Thus, as future configurations/standards are developed that a programmable logic device with the megafunction block will interfaces with, the settings for interfacing with the standards may be added to the register array. Consequently, the pin count will not need to increase as the megafunction block is scalable as described herein. Control logic verifies that the translated address is a valid address and the control logic will generate a selection signal based on whether a read or write operation is to be performed.

In another aspect of the invention, a method for configuring reconfigurable features of a programmable logic device (PLD) is provided. In the method, address data is serially shifted into a register array through a fixed serial interface of the megafunction block within the core of the PLD. Once the data is shifted into the register block a load signal is transitioned to indicate completion of the loading of the data. The address data is translated to an actual address and the actual address is verified as being valid by the control logic. Upon verification that the address data is valid, the data at the actual address is read from the actual address and a copy of the data is stored within the megafunction block. The read or write operation is then executed. In one embodiment, for a write operation, a portion of the data to be written to the actual address is masked with a portion of the copy of the data stored within the megafunction block.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for a megafunction block for managing a large number of modes and I/O ports. The embodiments described below further enable a simplified management scheme for product enhancement over the life cycle of the product. It will be obvious, however, to one skilled in the art, that the present invention may be practiced without some or all of these specific details. In other instances, well known process operations have not been described in detail in order not to unnecessarily obscure the present invention.

The embodiments described below include an intellectual property (IP) block for a programmable logic device (PLD). The IP block is a hardware structure used to manage configurable options for the PLD. For example, with regard to a high speed serial interface (HSSI) for the PLD, the HSSI may interface with numerous transmission standards and the PLD may be placed on different printed circuit boards (PCB). The various options and the corresponding configuration to operate on a certain PCB are managed through the IP block described herein. The IP block, also referred to as a megafunction block or megafunction engine, includes a register map that performs address translation from a user's virtual address space to a physical address space. Additional features can be subsequently incorporated into the register map so that the megafunction block is scalable. Of course, the megafunction block is backwards compatible.

Figure 1:
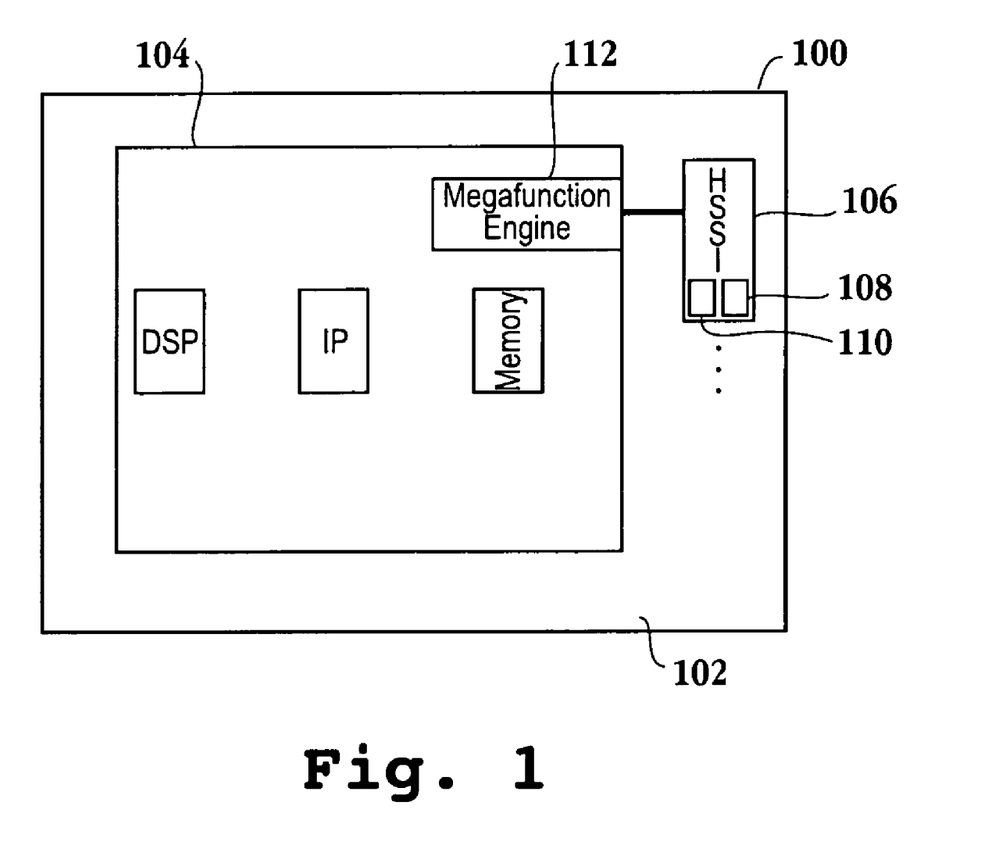
FIG. 1 is a high level schematic diagram of a programmable logic device in accordance with one embodiment of the invention.

FIG. 1 is a high level schematic diagram of a programmable logic device in accordance with one embodiment of the invention. Programmable logic device 100 includes I/O ring 102 surrounding core region 104. High speed serial interface (HSSI) 106 is an interface within I/O ring 102 for communicating with external chip and signals. HSSI 106 includes Adaptive Dispersion Compensation Engine (ADCE) block 108, which resides in the Physical Medium Attachment (PMA) portion of the HSSI, along with other circuitry which is provided to tune the impedance of a receive input buffer to match the impedance of a particular PCB trace that interfaces with the receive input buffer. HSSI 106 also includes Dynamic Partial Reconfigurable Input/Output (DPRIO) block 110. DPRIO block 110 serves as a configuration mechanism for setting configuration parameters within the HSSI 106. In one embodiment, DPRIO block 110 enables setting of the voltage offset configuration parameters to be applied at the inputs of comparators associated with each receiver in the PMA. One skilled in the art will appreciate that core region 104 includes a number of intellectual property (IP) blocks, such as a digital signal processing block, memory regions, logical array blocks, etc. It should be appreciated that a number of communication pathways exist for communication within and between blocks of the core region, and between core region 104 and external blocks. The details of these communication pathways are not shown for ease of illustration.

Still referring to FIG. 1, within core region 104 is included a megafunction engine 112 which communicates with DPRIO 110. Within megafunction block 112, a hardware structure and register map architecture is incorporated that greatly simplifies a megafunction that controls various modes of HSSI block 106. It should be appreciated that due to the large number of modes, the large number of I/O ports, and the complexity required to manage the large number of modes, the embodiments described herein enable a much more simple management of product enhancement over time. As mentioned previously, the embodiments described herein are scalable and backward compatible. Thus, as more and more functions become available to the PLD, megafunction block 112 can easily accommodate the additional features by adding the virtual address for the features to a register map as described below in accordance with one embodiment of the invention.

Figure 2:
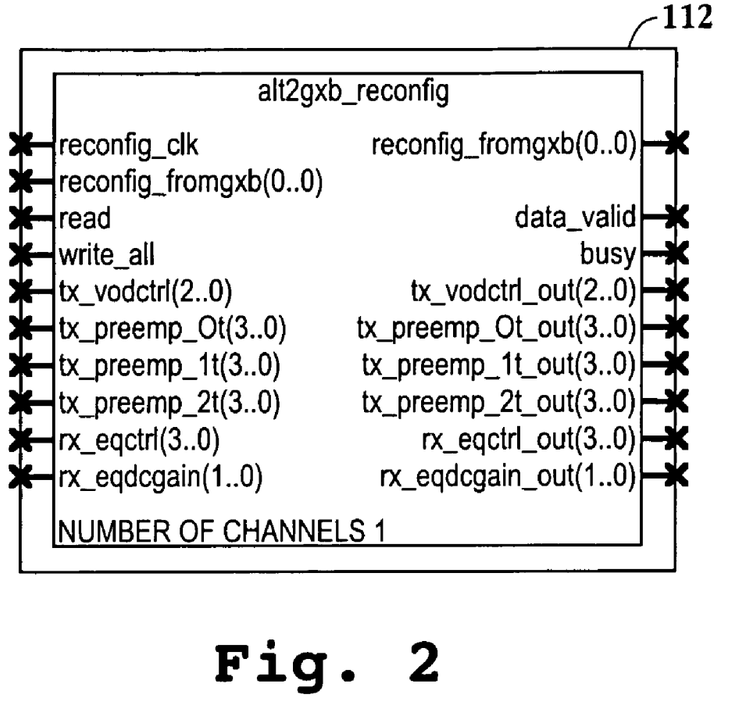
FIG. 2 illustrates a reconfigurable megafunction block that uses multiple I/O ports to reconfigure a subset of reconfigurable features in the DPRIO of the HSSI in accordance with one embodiment of the invention.

FIG. 2 illustrates a reconfigurable megafunction block that uses multiple I/O ports to reconfigure a subset of reconfigurable features in the DPRIO of the HSSI in accordance with one embodiment of the invention. In this embodiment, each function or feature for the DPRIO has a set of I/O ports. For example, in one embodiment, there may be 21 input and 21 output pins, as well as four status and control pins to reconfigure. Accordingly, 76 combinations can be read out of four different functions. Additionally, there are five pins used to connect to the embedded HSSI. While this configuration is sufficient for a few functions and provides backward compatibility to a previous family of PLDs, the limitations become apparent when applied to a large number of functions. It should be appreciated that the HSSI may contain many reconfigurable functions. In addition, current practices within the industry cause the release of a few key structures at a time that have been characterized. Each time a feature has been characterized and enabled, a new interface with additional I/O ports are presented to the user. The megafunction interface 112 of FIG. 2 would quickly become overcrowded with I/O ports and become a clumsy interface for a user. Furthermore, future generations are expected to have more functions, as well as more reconfigurable options compounding the issue for the number of I/O ports, expandability, and ease of use.

Figure 3:
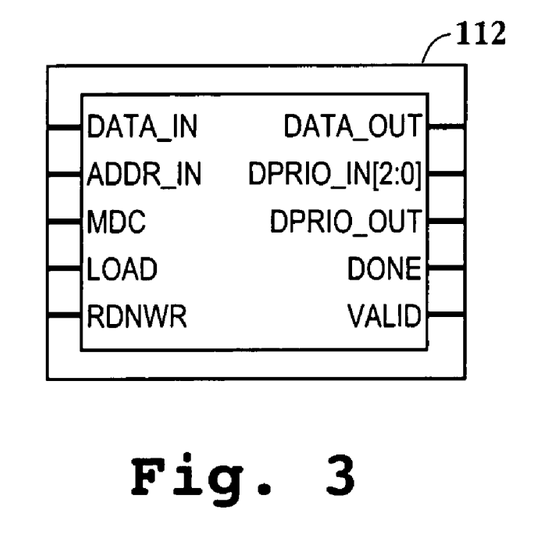
FIG. 3 is a simplified schematic diagram providing an overview of a mechanism to provide an easy to use megafunction in a corresponding interface that is flexible and expandable in accordance with one embodiment of the invention.

FIG. 3 is a simplified schematic diagram providing an overview of a mechanism to provide an easy to use megafunction in a corresponding interface that is flexible and expandable in accordance with one embodiment of the invention. The embodiments described below use megafunction block 112 with a fixed serial interface that contains a serial address port in, serial data in and data out ports, status and control ports, and ports to connect to the DPRIO interface of the embedded IP. It should be appreciated that the megafunction with the fixed serial interface is an alternative to the embodiment with a set of IO ports for each configurable option as illustrated in FIG. 2. Within FIG. 3, it should be appreciated that the interface is structured to include the DATA_IN SIGNAL, DATA_OUT SIGNAL, ADDR_IN, DPRIO_IN[2:0], MDC, DPRIO_OUT, LOAD, DONE, RDNWR, and VALID ports to accommodate corresponding signals. A register map is included and provided to the user for each reconfigurable option. Further details on the register map are provided with reference to FIG. 5.

Figure 4:
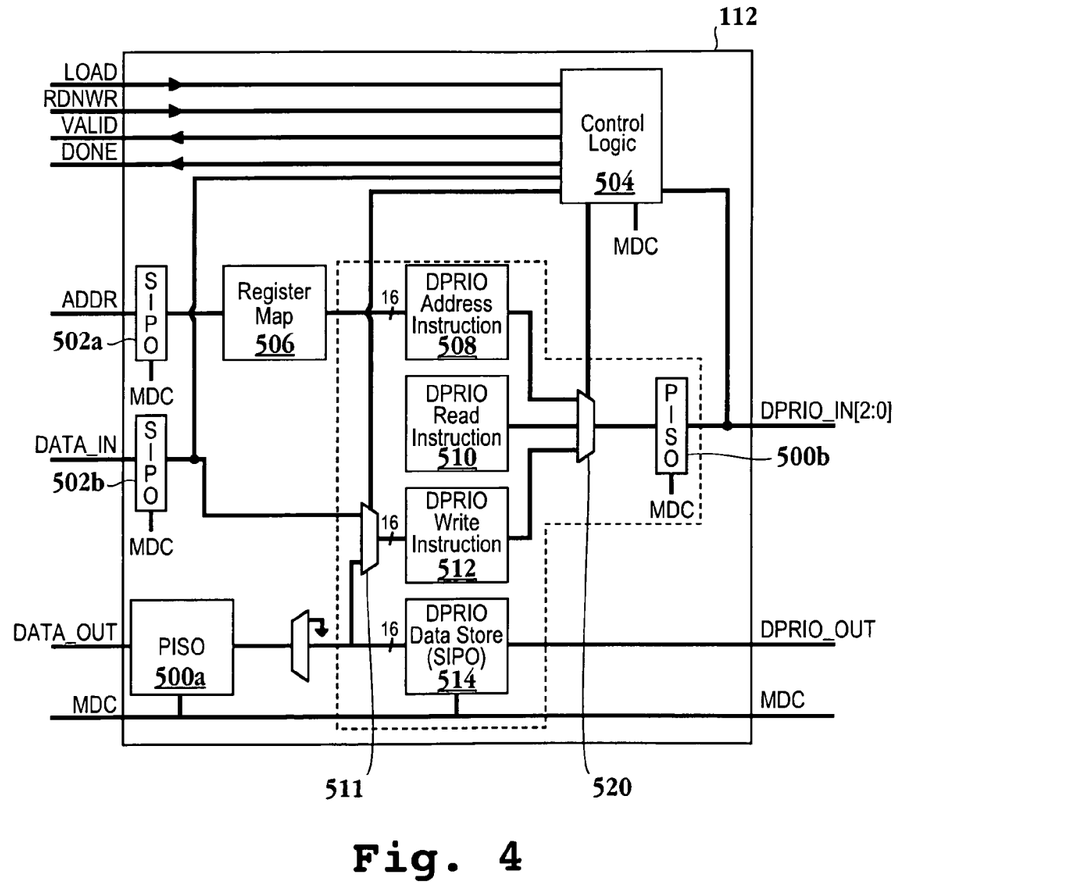
FIG. 4 is a detailed schematic diagram of a megafunction engine in accordance with one embodiment of the invention.

FIG. 4 is a detailed schematic diagram of a megafunction engine in accordance with one embodiment of the invention. Megafunction block 112 includes serial in parallel out (SIPO) blocks 502a and 502b which receive ADDR and DATA_IN, signals, respectively. It should be appreciated that MDC signal used throughout megafunction block 112 represents a clock signal. Megafunction block 112 also includes parallel in serial out (PISO) blocks 500a and 500b. Parallel in serial out block 500a provides a DATA_OUT signal through the serial interface. Here, data from the actual address is retrieved from the external memory region and stored in DPRIO data store block 514. The data stored in DPRIO data store block 514 may be used to mask reserve bits for a write operation as explained in more detail below.

Still referring to FIG. 4, address and data are shifted in to the serial interface through corresponding SIPO blocks 502a and 502b, where the address data is transmitted to register map 506 from SIOPO block 502a. Register map 506 provides the actual physical address and bit locations to DPRIO address instruction block 508. Control logic block 504 will ensure that the address and the data are valid. In one embodiment, there can be a mapping file that contains all the reserved bits/addresses to ensure the data and address are valid. In addition, control logic block 504 provides a select signal to multiplexor 520 to select between the inputs to multiplexor 520 for output. Multiplexor 520 receives input from DPRIO address instruction block 508, DPRIO read instruction block 510, and DPRIO write instruction block 512. It should be appreciated that the address instruction will be selected first and then depending on whether a read or write instruction is performed, the output of DPRIO read instruction block 510 or DPRIO write instruction block 512 is selected. The output from parallel in serial out block 500b is then provided to the DPRIO block within a high speed serial interface in accordance with one embodiment.

Register map 506 is provided to the user for each reconfigurable option. In one embodiment, the register map is a subset of the full DPRIO space. Register map 506 allows the incremental release of characterized features and easily expands to future releases. The additional features are simply added to register map 506 as discussed with reference to FIG. 5. Register map 506 is also a powerful feature that enables standardization of the representation of all future DPRIO features and offers backward-compatibility regardless of the actual DPRIO addressing scheme of future PLD families. Register map 506 may used to change single settings at a time, and also allows the user to switch from one protocol with hundreds of options to an entirely different protocol by writing a single or few address and bit locations. It should be appreciated that the embodiments are not limited to connecting to one Quad's DPRIO interface. All the Quads' DPRIO interfaces can be tied through the fixed serial interface of the megafunction engine and provide unique or common settings to each one. It should be further appreciated that even with all the powerful capabilities of the megafunction engine, the interface remains a fixed and easy-to-use interface to the user.

DPRIO data store block 514 of FIG. 4 is used to mask reserve bits in accordance with one embodiment of the invention. It should be appreciated that in some embodiments, e.g., when performing a write instruction, the entire 16 bits may be written even though only 8 bits are being actually changed. DPRIO data store 514 ensures that the old information is stored and used in this embodiment. Here, the data is captured from the actual address, e.g., in response to the output from DPRIO address instruction block 508, and stored in DPRIO data store block 514. Input of the data to DPRIO write instruction block 512 is controlled through multiplexor 511 and control logic 504. Thus, for the example where 8 bits are actually changing, control logic 504 selects the eight bits that are changing from the output of SIPO 502*b* and the 8 bits that are not changing from DPRIO data store 514. As noted above, megafunction engine 112 will utilize register map 506 and determine the real address and bit locations. In addition, megafunction engine 112 checks whether the address or data is valid and inserts the valid port. If the address and/or data are not valid, a DONE signal goes low. The RDNWR port is set by the user to determine whether the user wants to write to register map 506 or read out current settings from the register map. The load pin will execute the writing or reading of register map 506 after the ADDR and DATA_IN have been serially shifted in.

More specifically, megafunction block 112 of FIG. 4 internally executes instructions to set the address, read the original settings of reserved locations, rewrites to the reserved locations, and write to the modifiable location of the DPRIO. However, as mentioned above, megafunction block 112 does not have to be limited to a DPRIO. That is, megafunction block 112 and the included functionality may be extended to the reconfigurable features of the entire PLD, such as clock management features that enable a user to change a Phase Lock Loop (PLL) configuration without reprogramming an entire device. In addition, other PLL control features, such as programmable delay shifts, programmable phase shifts, programmable bandwidth, clock power down and clock source select, and clock switchover functions. When the instruction is successfully completed, the DONE signal is transitioned, i.e., goes high. As mentioned previously, the MDC signal is the serial clock that is used for the megafunction engine 112 as well as the DPRIO of the embedded IP.

Figure 5:
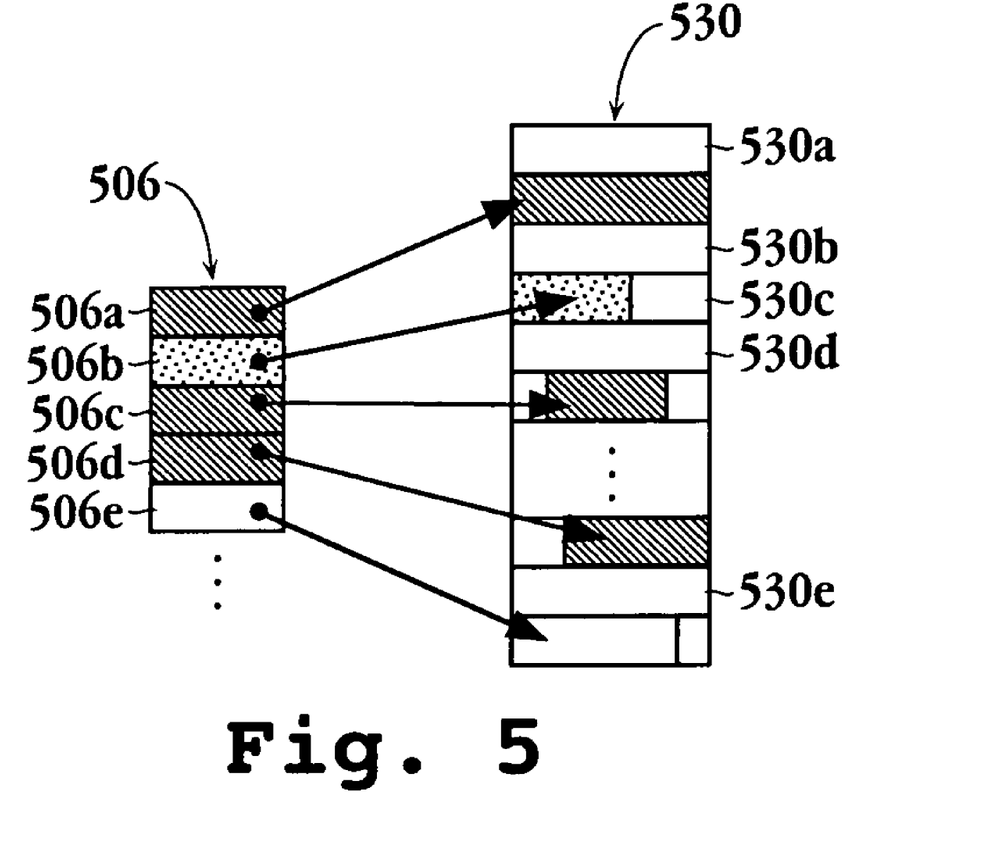
FIG. 5 is a simplified schematic diagram illustrating the register map in more detail in accordance with one embodiment of the invention.

FIG. 5 is a simplified schematic diagram illustrating the register map in more detail in accordance with one embodiment of the invention. It should be appreciated that register map 506 is a subset of full DPRIO space 530. Therefore, register map 506 allows the incremental release of characterized features and easily expands to future releases. It should be appreciated that adding data to the bottom of register map 506 accommodates the incremental release of the features. Register map 506 is also a very powerful feature that can allow the standardization of the representation of all future DPRIO features and offer backward compatibility regardless of the actual DPRIO addressing scheme of future families of PLDs. In addition to being used to enable the change of single settings at a time, register map 506 enables a user to switch from one protocol with hundreds of options to an entirely different protocol by writing to a single or a few address and bit locations. Each entry 506*a-e* within register map 506 may represent a feature in one embodiment. Entries 506*a-e* map to corresponding entries within full DPRIO space 530, as illustrated. Thus, the features listed in FIG. 2 may be consolidated into register map 506, thereby avoiding the need to provide a pin for each feature. Regions 530*a-n* represent addresses or bits within full DPRIO space 530 that have not been released or characterized and are subsequently available for future feature added to register map 506.

Figure 6:
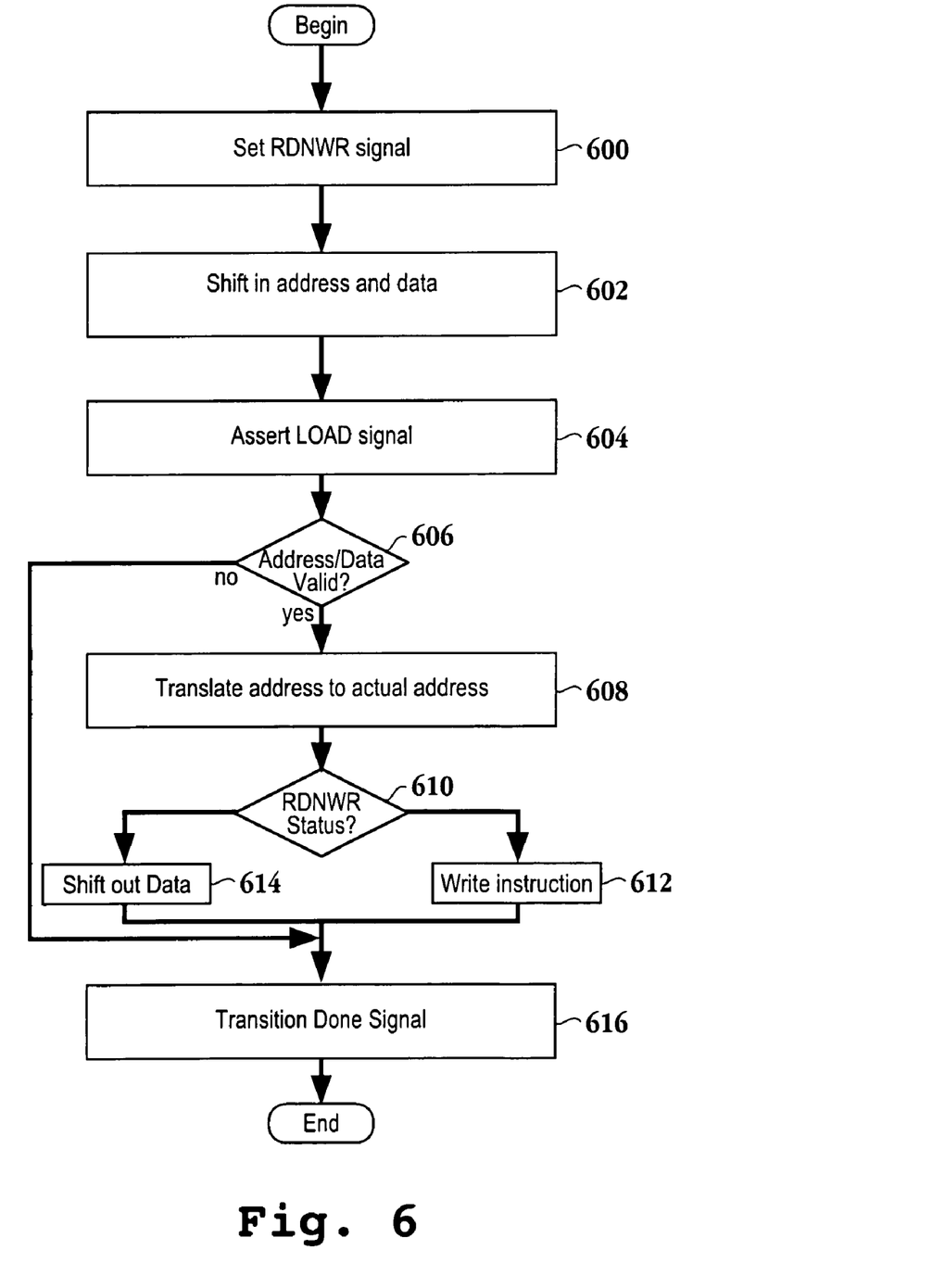
FIG. 6 is a flow chart diagram illustrating the method operations for utilizing the megafunction engine in accordance with one embodiment of the invention.

FIG. 6 is a flow chart diagram illustrating the method operations for utilizing the megafunction engine in accordance with one embodiment of the invention. The method initiates with operation 600 where RDNWR signal is set to high for a read operation, or to a low state for a write operation. With reference to FIG. 5, the RDNWR is transmitted to control logic block 504 which then ensures that the data and address coming in are valid. The method then advances to operation 602 where 16 bit address and data are shifted in simultaneously in a serial fashion. Again, with reference to FIG. 5, the address and data are shifted in through corresponding serial in parallel out blocks with the address being transmitted to the register map. The method then advances to operation 604 where a LOAD signal is asserted at the end of the 16 bits to execute the instruction. When asserting the LOAD signal it should be appreciated that the DONE signal goes to a low state. In operation 606, the control logic checks the address/data to see if it is valid and asserts a VALID signal if the data is valid. If the data is not valid, the VALID signal will transition to a low state and the DONE signal will transition to a high state. If the data is valid, the method moves to operation 608 where the address delivered to the register map is translated and the read instruction is also executed while the original setting is stored. With reference to FIG. 5, the original data is stored in the data store block.

Referring to FIG. 6, if the RDNWR signal is low in decision operation 610, then a write instruction is to be performed in operation 612 with the original setting for reserved bits and new settings for modifiable bits. If the RDNWR signal is high in decision operation 610, the data is shifted out in operation 614. It should be appreciated that in one embodiment, user logic would continually latch the data while the done signal is low and capture data when the done signal goes high. Upon completion of operations 612 and 614, the done signal will transition to a high state in operation 616. It should be appreciated that the embodiments described above cover a small hardware structure and register map architecture to greatly simplify the megafunction that controls various modes of the HSSI blocks of programmable logic devices. It should be further appreciated that the embodiments described herein may be expanded to be associated with any reconfigurable features of the programmable logic device.

In summary, the above-described invention provides for an intellectual property block that acts as a megafunction engine and has a fixed serial interface. The megafunction engine is scalable through the register map so that later released features may be incorporated into the megafunction engine. While the embodiments above describe an example related to a DPRIO block of a HSSI, this is not meant to be limiting. That is, the embodiments may be expanded to accommodate any reconfigurable block of the PLD through the control logic, the register map, and corresponding architecture described above. With regard to the embodiments that support switching from one protocol to another, in the register map, one particular address or bit may be set aside within the address for standard protocol, for example, IEEE802.3 (Gigabit Ethernet), and another for OC-12 (Sonet/SDH). Many configuration bits would need to be changed to switch the frequency as well as the type of the operation associated with each protocol. By setting the reserved address/bit for these protocols, the register map would define all the necessary address/bits that would need to be changed and execute the needed instructions/settings to switch from one protocol to the other.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A hardware block for an integrated circuit, comprising:
 a serial interface;
 a register array receiving address information from one port of the serial interface, the register array mapping the address information to an actual address;
 control logic for determining whether one of a read operation or a write operation is requested through a second port of the serial interface, wherein the control logic generates a selection signal based on whether the one of the read operation or the write operation is requested so that a corresponding configurable instruction is selected for output external to the hardware block from a third port of the serial interface; and selection logic for communicating with a memory region external to a core region, the selection logic receiving the selection signal and the actual address.

2. The hardware block of claim 1, wherein the control logic verifies whether the address information is valid address information.

3. The hardware block of claim 1, wherein the serial interface is a fixed serial interface and includes a maximum of 10 ports.

4. The hardware block of claim 1, wherein the hardware block is located within the core region of the integrated circuit.

5. The hardware block of claim 4, wherein the selection signal is output to a multiplexor receiving write instructions, read instructions and address instructions.

6. The hardware block of claim 5, wherein the memory region external to the core region is located within a high speed serial interface of the integrated circuit.

7. A hardware block for an integrated circuit, comprising:
 a serial interface;
 a register array receiving address information from one port of the serial interface, the register array mapping the address information to an actual address; and
 control logic for determining whether one of a read operation or a write operation is requested through a second port of the serial interface, wherein the control logic generates a selection signal based on whether the one of the read operation or the write operation is requested so that a corresponding configurable instruction is selected for output external to the hardware block from a third port of the serial interface, wherein ports of the serial interface are selected from a group consisting of DATA_IN SIGNAL, DATA_OUT SIGNAL, ADDR_IN, DPRIO_IN[2:0], MDC, DPRIO_OUT, LOAD, DONE, RDNWR, and VALID ports.

8. A hardware block for an integrated circuit, comprising:
 a serial interface;
 a register array receiving address information from one port of the serial interface, the register array mapping the address information to an actual address; and
 control logic for determining whether one of a read operation or a write operation is requested through a second port of the serial interface, wherein the control logic generates a selection signal based on whether the one of the read operation or the write operation is requested so that a corresponding configurable instruction is selected for output external to the hardware block from a third port of the serial interface, wherein the hardware block communicates configuration parameters for a dynamic partial reconfigurable Input/Output (DPRIO) block of a high speed serial interface.

9. The hardware block of claim 8, wherein the DPRIO enables setting of voltage offsets.

10. An integrated circuit, comprising:
 a high speed serial interface (HSSI) having a configuration block incorporated therein, the configuration block enabling the HSSI to communicate with different standards; and
 a megafunction engine within a core region of the integrated circuit, the megafunction engine in communication with the HSSI, the megafunction engine including,
  a serial interface;
  a register array receiving address information from one port of the serial interface, the register array mapping the address information to an actual address; and
  control logic for determining whether one of a read operation or a write operation is requested through a second port of the serial interface, wherein the control logic generates a selection signal based on whether the one of the read operation or the write operation is requested so that a corresponding configurable instruction is selected for output from a third port of the serial interface.

11. The integrated circuit of claim 10, wherein ports of the serial interface are selected from a group consisting of DATA_IN SIGNAL, DATA_OUT SIGNAL, ADDR_IN, DPRIO_IN[2:0], MDC, DPRIO_OUT, LOAD, DONE, RDNWR, and VALID ports.

12. The integrated circuit of claim 10, wherein the mega function engine includes selection logic for communicating with a memory region external to the core region, the selection logic receiving the selection signal and the actual address.

13. The integrated circuit of claim 10 wherein the register array maps the address information through an address translator.

14. The integrated circuit of claim 10 wherein the register array is expandable and the serial interface is a fixed serial interface.

15. The integrated circuit of claim 10 further including a data store block storing a portion of bits for the write operation, the portion of bits being maintained during the write operation, while a remaining portion of the bits change during the write operation.

16. A method for configuring reconfigurable features of an integrated circuit, comprising method operations of:
   serially shifting in address information into a register of a core region of the integrated circuit;
   converting the address information to a parallel format;
   translating that address information to an actual address for the address information;
   serially shifting out an instruction to the actual address, the actual address associated with a memory external to the core region; and one of
   writing instructions to the actual address for a write operation or reading data from the actual address for a read operation.

17. The method of claim 16, further comprising:
   selecting between one of a read operation and a write operation.

18. The method of claim 17, further comprising:
   masking a portion of bits when writing instructions to the actual address.

19. The method of claim 16, further comprising:
   reading contents of the actual address; and
   storing the contents prior to the writing or the reading.

20. The method of claim 16, further comprising:
   asserting a signal indicating that the serially shifting in address information into the register has completed.

* * * * *